United States Patent
Maier et al.

(10) Patent No.: US 7,054,729 B2
(45) Date of Patent: May 30, 2006

(54) METHOD FOR DETERMINING GEOMETRIC DATA FOR VEHICLE PARKING PROCESSES

(75) Inventors: Dietmar Maier, Furth B. Landshut (DE); Frank Gensler, Neubiberg (DE); Helmut Spannheimer, Neukeferloh (DE); Harald Graef, Geisenhausen (DE); Alfred Pruckner, Munich (DE); Karl-Heinz Meitinger, Trostberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/120,962

(22) Filed: May 4, 2005

(65) Prior Publication Data

US 2005/0203686 A1   Sep. 15, 2005

Related U.S. Application Data

(63) Continuation of application No. PCT/EP2003/011509, filed on Oct. 17, 2003.

(30) Foreign Application Priority Data

Nov. 6, 2002   (DE)   ................................ 102 51 558

(51) Int. Cl.
*G01S 13/00* (2006.01)
(52) U.S. Cl. ........................... 701/36; 701/301; 342/70; 340/932.2
(58) Field of Classification Search .................. 701/36; 348/119; 342/72
See application file for complete search history.

(56) References Cited

U.S. PATENT DOCUMENTS

| 4,931,930 A | * | 6/1990 | Shyu et al. | .................... 701/36 |
| 6,683,539 B1 | * | 1/2004 | Trajkovic et al. | ........ 340/932.2 |
| 2002/0198634 A1 | * | 12/2002 | Shimazaki et al. | ............ 701/1 |
| 2003/0156045 A1 | * | 8/2003 | Tanaka et al. | ........... 340/932.2 |

FOREIGN PATENT DOCUMENTS

| DE | 37 28 948 A1 | 3/1989 |
| DE | 38 13 083 A1 | 11/1989 |
| DE | 196 16 447 A1 | 10/1997 |
| EP | 0 915 350 A2 | 5/1999 |
| JP | 06 028598 | 5/1994 |

* cited by examiner

*Primary Examiner*—Yonel Beaulieu
*Assistant Examiner*—Christine M. Behncke
(74) *Attorney, Agent, or Firm*—Crowell & Moring LLP

(57) ABSTRACT

Method for determining geometric data for parking processes of vehicles, wherein the lateral distance between the vehicle and a curb is measured several times successively by means of a distance sensor attached to the vehicle as the vehicle is driven by the parking space. The angle of the longitudinal axis of a vehicle and the curb is ascertained by determining a sideways movement angle between the present longitudinal direction of the vehicle and a preset longitudinal direction, which angle results from the sideways movement of the vehicle as it is driven along, by determining a curb angle between the preset longitudinal direction and the curb, which angle results from the course of the curb contour, and by determining the angle between the present longitudinal axis of the vehicle and the curb by adding the angle of sideways movement and the curb angle.

9 Claims, 3 Drawing Sheets

METHOD FOR DETERMINING GEOMETRIC DATA FOR VEHICLE PARKING PROCESSES

The present application is a continuation of International Application No. PCT/EP2003/011509, filed Oct. 17, 2003, and claims priority under 35 U.S.C. § 119 to German Application No. 102 51 558.1, filed Nov. 6, 2002, the entire disclosure of the aforementioned documents is herein expressly incorporated by reference.

BACKGROUND AND SUMMARY OF THE INVENTION

The present invention relates to a method for determining geometric data for vehicle parking processes.

It is believed that driver assistance systems will be used to an increasing extent in future generations of vehicles. Parking assistance systems are already widespread in which the distance from obstacles in the front and/or rear area of the vehicle when parking is measured by ultrasonic sensors and the driver receives an audible indication.

A method of determining the length of a parking gap between a vehicle parked in front and one parked behind is disclosed in German Patent Document Number DE 196 16 447 A1. An ultrasonic or radar transceiver is installed in the vehicle to be parked to measure the length of the parking gap. As the vehicle to be parked drives slowly past the parked vehicles, the position of the vehicle to be parked is determined in the driving direction relative to the front end of the vehicle parked behind, and from this position the distance of the car parked in front from the vehicle to be parked is determined. The distance between the two parked vehicles, i.e., the length of the parking space, is determined from the measurements. It is also mentioned that it can be useful to measure and take into account the lateral distance of the moving vehicle to the vehicle parked behind in order to determine the position of the moving vehicle relative to the front end of the vehicle behind. The details of how this is performed are not provided in the aforementioned patent document.

The object of the present invention is to provide a method by which, as exact as possible, geometric data relevant to parking processes can be ascertained at the lowest possible technological expense.

This object is achieved by a method for determining geometric data for parking processes for vehicles, wherein the lateral distance between the vehicle and a curb is measured at least twice successively, by a vehicle-affixed distance sensor as the vehicle is driven alongside the parking space, and the angle between the longitudinal axis of a vehicle and the curb is determined, by the acts of: determining an angle of sideways movement between the present longitudinal direction of the vehicle and a preset longitudinal direction, which angle results from the sideways movement of the vehicle as it is driven by; determining a curb angle between the preset longitudinal direction and the curb resulting from the course of the contour of the curb; and determining the angle between the present longitudinal axis of the vehicle and the curb by adding the sideways movement angle and the curb angle.

In accordance with exemplary embodiments of the present invention, geometric data for a vehicle to be parked, which is moving alongside a parking space or parking gap, which are relevant to a parking process or an electronically controlled parking process is determined. The geometric data can include the angle between the longitudinal axis of the vehicle and the curb, as soon as it can be derived, the distance between a sensor point on the vehicle and the curb, i.e., the distance between the vehicle and the curb, and the effective length of the parking space or gap.

The present invention takes into account the sideways movement of the vehicle to be parked "sideways to the parking space or sideways to the parking gap" when determining the angle between the longitudinal axis of the vehicle and the curb. To determine the angle between the longitudinal axis of the vehicle and the curb, a distance sensor is provided on the vehicle, for example an ultrasonic, radar or laser sensor, with which the lateral distance is measured between the vehicle or, more precisely, between the sensor point on the vehicle, and the curb.

According to the present invention, the angle between the longitudinal axis of the vehicle and the curb is the sum of a "angle of sideways movement" and an "angle of the curb". During the parking process, drivers often do not drive by the parking gap in an exactly parallel manner. Instead, the drivers often turn briefly in the direction of the parking gap in the first third or the middle of the parking gap and then drives forward at an angle to a stop before backing into the parking gap. Depending on the steering behavior of the driver, the vehicle to be parked thereby makes a certain sideways movement when passing the parking gap. "Angle of sideways movement" is understood hereinafter to mean the angle between the present longitudinal direction of the vehicle when moving past the parking space or gap and a "preset longitudinal direction". The "preset longitudinal direction" is understood to mean, for example, the direction in which the vehicle is moving before beginning to turn in, i.e., before a "change in course". The preset longitudinal direction can quite generally be understood to mean the direction in which the vehicle is moving when going in a straight line. The preset longitudinal direction may essentially be parallel to the curb.

Sometimes the vehicle is moving in a straight line, but diagonally to the curb. The curb is then not parallel to the selected preset longitudinal direction. The angle between the preset longitudinal direction and the curb is hereinafter called the "curb angle". The angle sought between the longitudinal axis of the vehicle and the curb is the sum of the angle of sideways movement and the curb angle.

According to an aspect of the present invention, the angle of sideways movement is determined from a "path relationship", i.e., from a "sideways movement distance component" and the path covered by the vehicle between two measurement points when being driven alongside the parking space or gap. The "sideways movement distance component" is the sideways movement of the sensor point of the vehicle in relation to the preset longitudinal direction. The sideways movement distance component is determined by measuring the path covered by the vehicle when moving alongside the parking space between two measurement points and the steering position controlled by the driver, i.e., the steering angle on the steering column or the steering angle of the steered wheels. The sideways movement distance component can be determined from the path covered between two measurement points and the steering position by a preset mathematical vehicle model and trigonometric conversion. The angle of sideways movement is determined from this by further simple trigonometric conversion.

To determine the curb angle, the difference of two distance measurements between the sensor point on the vehicle and the curb is determined. The previously determined sideways movement distance component is then subtracted from this difference. The resulting difference is hereinafter called the "curb distance component". The curb distance component can be interpreted as the "angularity" of the curb relative to the preset logitudinal direction taken as the basis. The curb angle can be determined by trigonometric conversion from the curb distance component and the path covered by the vehicle when moving alongside the parking space or gap. As already mentioned, the curb angle is the present angle between the preset longitudinal direction and the curb.

The curb angle and the angle of sideways movement are then added, to provide the angle sought between the longitudinal direction of the vehicle and the curb.

The "division" of the angle between the longitudinal axis of the vehicle and the curb into an angle of sideways movement and a curb angle has very substantial advantages in terms of the accuracy of measurement attainable over a direct determination of the angle sought from two consecutive distance measurements.

The angle of sideways movement can be determined with great precision with relatively few problems. This requires only a sufficiently accurate vehicle model, the path covered by the vehicle between two measurement points which can, for example, be determined via ABS sensors, and the steering position of the vehicle which can, for example, be measured by steering angle sensors on the steerable wheels or on the steering column.

Determining the curb angle as precisely as possible is much more problematic. For this purpose, the distance must be determined between the distance sensor attached to the vehicle and the curb. This distance measurement can be faulty due to various distorting factors. Measurement errors can be caused, for example, by curved curbstones, stones on the roadway, manhole covers or objects lying on the roadway.

To "smooth out" measurement errors in determining the curb angle, it is therefore desirable to take distance measurements at short intervals of, for example, 2.5 cm as seen in the direction in which the vehicle is moving. In this way, a large number of measurements are taken. By repeating the procedure described above to determine curb angles, several curb angles are obtained from which a mean value, i.e., a mean curb angle, can be formed. This mean value can largely eliminate different outliers and produce a sufficiently precise result for the curb angle.

Another highly essential parameter for automatic control or regulation of a parking process is the present distance of the vehicle from the curb, or more precisely, the distance of a vehicle-affixed sensor point from the curb.

In theory, the distance could be determined by a simple measurement of distance. As already explained, various measurement errors may occur in this process. Consequently it is difficult to assess the accuracy of individual measurements. In the extreme case, individual measurements may be completely unusable. Therefore, it is advantageous to determine a "mean distance".

According to an aspect of the present invention, the method includes making successive several distance measurements between the vehicle affixed sensor point and the curb as the vehicle moves by the parking gap. The "sideways movement distance component" and the "curb distance component" explained above are each subtracted from the distances measured. A mean value is then formed from the values obtained.

Accordingly, the sideways movement distance component and the curb distance component are each calculated from the individual distance measurements; A mean value is formed from the values obtained. The present distance of the vehicle-affixed sensor from the curb is then obtained by adding the mean values obtained to the previously calculated sideways movement distance components and the curb distance components. Accordingly, the actual present distance of the vehicle-affixed sensor from the curb can be determined with great accuracy. The larger the number of distance measurements entering into the calculation, the more errors are "smoothed out".

Another essential parameter for automating parking processes is the effective length of the parking gap. As already explained, as they drive by a parking gap, many drivers steer briefly into the parking gap and then drive forward again at an angle, stop and back into the parking gap. The path covered by the vehicle in the area of the parking gap is therefore curved and thus longer than the effective length of the parking gap. With the procedure described above, the angle between the longitudinal axis of the vehicle and the curb can be determined at a large number of measurement points as the vehicle moves past the parking gap. According to an aspect of the present invention, the effective parking gap length is obtained by projecting the vehicle trajectory, i.e., of the path covered by the vehicle, onto the curb.

Thus the effective parking gap length can be determined mathematically at measurement intervals by trigonometric conversion from the path covered by the vehicle and the angle between the longitudinal axis of the vehicle and the curb at the individual measurement intervals.

The front and rear end of a parking gap can be determined by measuring in the following manner. When the vehicle to be parked is driven by the parking gap, there is a positive jump in the distance measurement signal as the distance sensor passes the rear end of the parking gap. The distance from the curb detected by the distance sensor therefore increases "abruptly". Correspondingly the distance measured makes a negative jump if the distance sensor passes the front end of the parking gap.

In order to eliminate distortions or to smooth out measurement errors, several successively measured measurement signals can also be taken into account when the front and rear end of a parking gap are determined. For example, the end of a parking gap is only acknowledged when a preset minimum number of measurements deviates by more than a preset value from the previous mean distance.

BRIEF DESCRIPTION OF THE DRAWING FIGURES

The present invention is illustrated in greater detail below in connection with the diagram, in which.

DETAILED DESCRIPTION OF THE INVENTION

Figure 1:
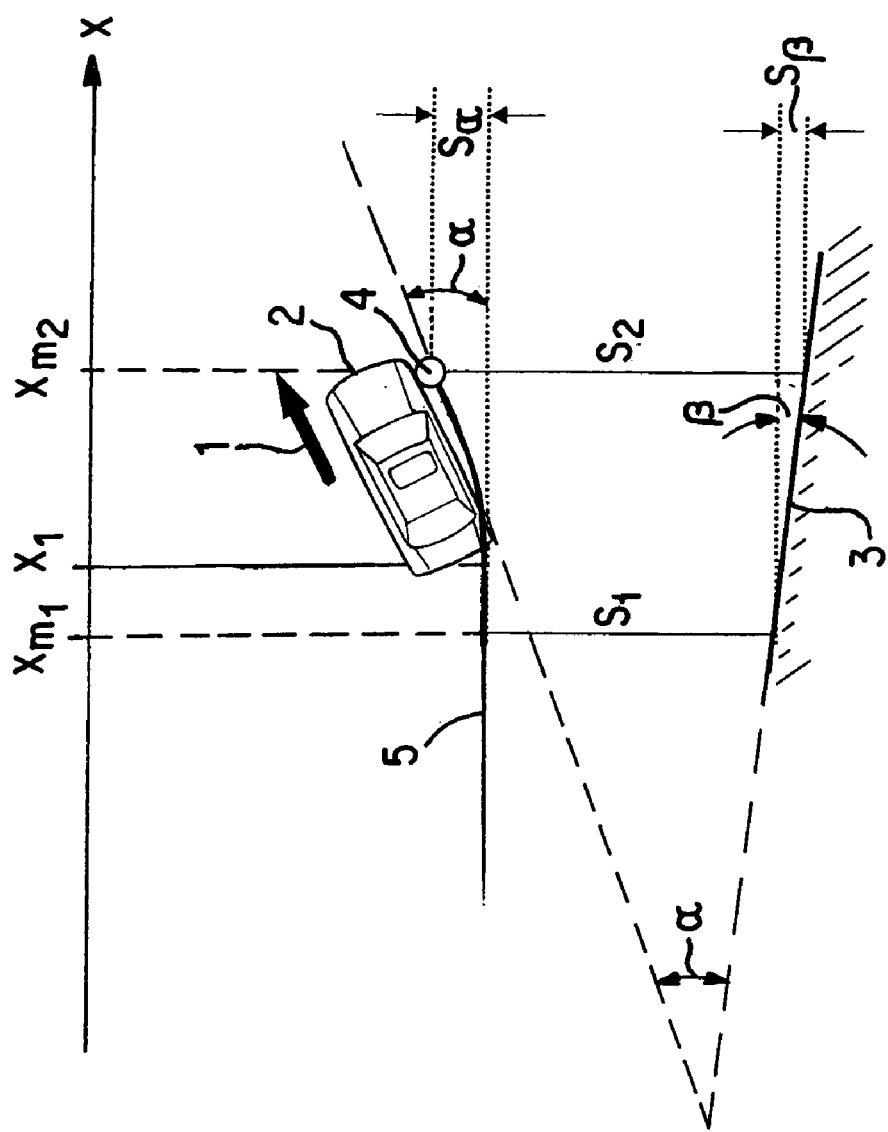
FIG. 1 illustrates the basic principle for determining the angle between the longitudinal direction of the vehicle and the curb.

FIG. 1 illustrates the basic principle for determining the angle between longitudinal axis 1 of vehicle 2 and a curb, here depicted schematically as curbstone 3. The angle between vehicle longitudinal axis 1 and curbstone 3 is here designated as γ. In the example of embodiment shown here, distance sensor 4 is located in the front right fender area of vehicle 2.

For easier understanding, a path coordinate x is illustrated. In an area "left" of $x_1$ the vehicle is moving straight ahead, and at $x_1$ it is turning to the left, which leads to a change in course. The reference number 5 designates the "sensor track" as vehicle 2 is being driven.

As already mentioned, vehicle 2 is moving straight ahead in the area left of $x_1$. In this area, sensor track 5 is also a straight line. The fact that the vehicle is moving straight ahead can be determined, for example, by steering sensors on the steerable wheels or on the steering shaft. The direction of the sensor track in the area left of $x_1$, i.e., when going straight, is hereinafter called the "preset longitudinal direction".

In determining angle γ, "angle of sideways movement" α and "curb angle" β subsequently become different. Angle of sideways movement α is the angle between present longitudinal direction 1 of the vehicle and preset longitudinal direction 5. Curb angle β is hereinafter defined as the angle between preset longitudinal direction 5 and curb 3. As can be seen from FIG. 1, angle γ is the sum of angles α and β.

Angle of sideways movement α is determined as follows. First, the sideways movement distance component $s_\alpha$ is determined and results from a sideways movement of the vehicle 2 between two consecutive measuring points $x_{m1}$ and $x_{m2}$ diagonally to preset longitudinal direction 5. The sideways movement distance component sa between two consecutive measuring points $x_{m1}$ and $x_{m2}$ is determined by measuring the path covered by vehicle 2 between the two measuring points $x_{m1}$ and $x_{m2}$ and the steering position of vehicle 2 in the area between the two measuring points $x_{m1}$ and $x_{m2}$, as well as a preset movement model of vehicle 2. The path covered by the vehicle between the two measuring points $x_{m1}$ and $x_{m2}$ can, for example, be measured by wheel revolution sensors (such as ABS sensors). The steering position of the vehicle can be measured by steering angle sensors on the wheels or the steering column. Angle of sideways movement α is obtained for the measuring interval $[x_{m1}, x_{m2}]$ by trigonometric conversion from the path covered by the vehicle between the two measuring points $x_{m1}$ and $x_{m2}$ and sideways movement distance component $s_\alpha$. In the manner described above, sideways movement distance component $s_\alpha$ and angle of sideways movement α a can each be determined for a large number of measuring intervals $[x_{mi}, x_{mi+1}]$.

Curb angle β is determined as follows. First, distance $s_1$, $s_2$ between distance sensor 4 and curb 3 is determined with distance sensor 4 at measuring points $x_{m1}$ and $x_{m2}$. Then sideways movement distance component $s_\alpha$ is subtracted from the difference $s_2 - s_1$ of the two distance measurements. This gives the "curb distance component" for the measurement interval $[x_{m1}, x_{m2}]$. The curb distance component is hereinafter called $s_\beta$. Curb angle β can be determined from the path covered by vehicle 2 in the measuring interval $[x_{m1}, x_{m2}]$ and curb distance component $s_\beta$ by trigonometric conversion. The angle γ is the sum of α+β.

Because there may be distortions and measuring errors in measuring the distance from distance sensor 4 to curb 3, curb angle β should be determined many times in succession. A mean curb angle β can then be formed from varyingly scattered curb angles β, for example, by finding the arithmetic mean.

Figure 2:
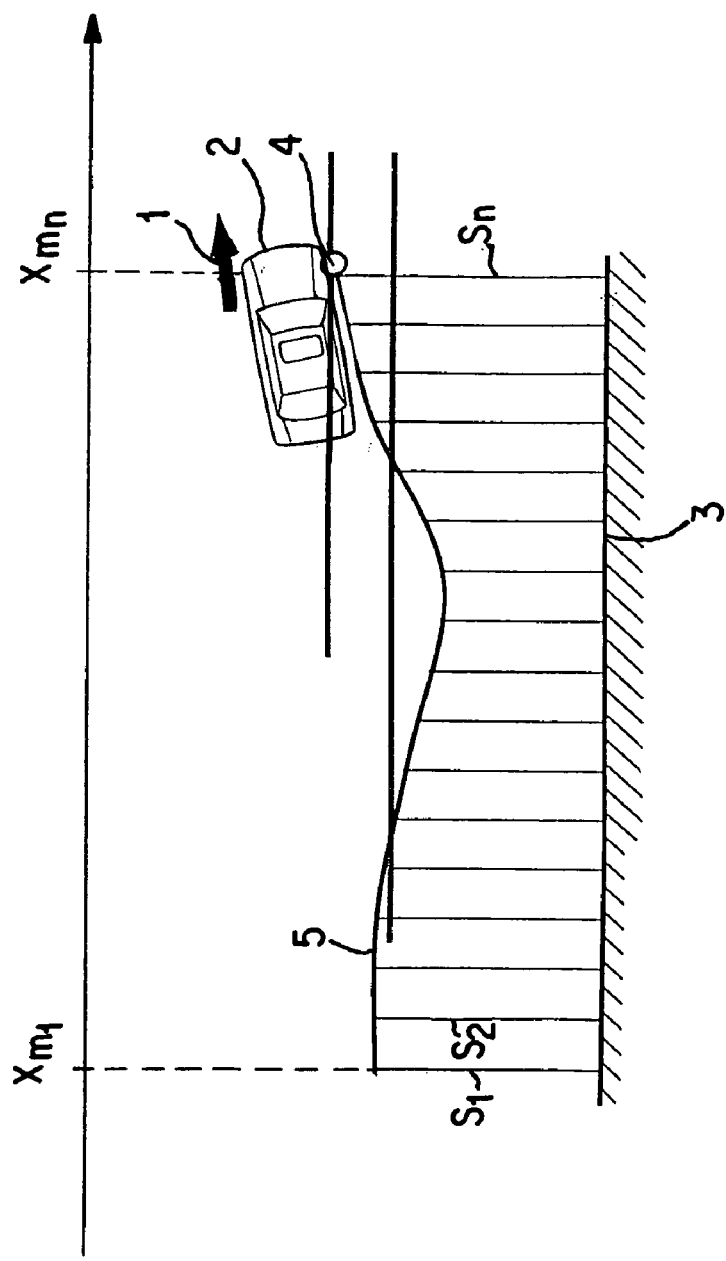
FIG. 2 illustrates the basic principle for determining the lateral distance to the curb.

FIG. 2 illustrates the basic principle for determining the distance of vehicle 2, or more precisely, of the vehicle-affixed distance sensor 4, from curb 3.

As vehicle 2 is driven past a parking gap, a distance measurement is performed by distance sensor 4 at regular intervals, i.e., at a great number of measurement points $x_{m1} \ldots x_{mn}$. Distance sensor 4 accordingly provides measurements $s_1, s_1, \ldots s_n$.

In a parking process, the driver usually first drives by the parking gap, stops and backs into it. When driving by the parking gap, many drivers steer briefly to the right toward the parking gap and then drive forward again diagonally to the left. This kind of "vehicle trajectory" is shown by sensor track 5 in FIG. 2.

To determine the present distance between sensor 4 and curb 3, a single measurement of distance would theoretically be sufficient. As already explained, individual measurement results can be erroneous due to measurement errors or distortions. Therefore, mean distance is therefore determined. The particular sideways movement distance component and the particular curb distance component (see above) are subtracted from several distance values $s_i$. After subtraction, a mean value is formed from the values obtained. The previously calculated sideways movement distance components and the curb distance components are added to this mean value for the individual measurement intervals. This provides the present distance.

Since many measurements form the basis for the mean, the calculated distance value agrees more closely with the actual distance than would be the case with individual measurement.

Figure 3:
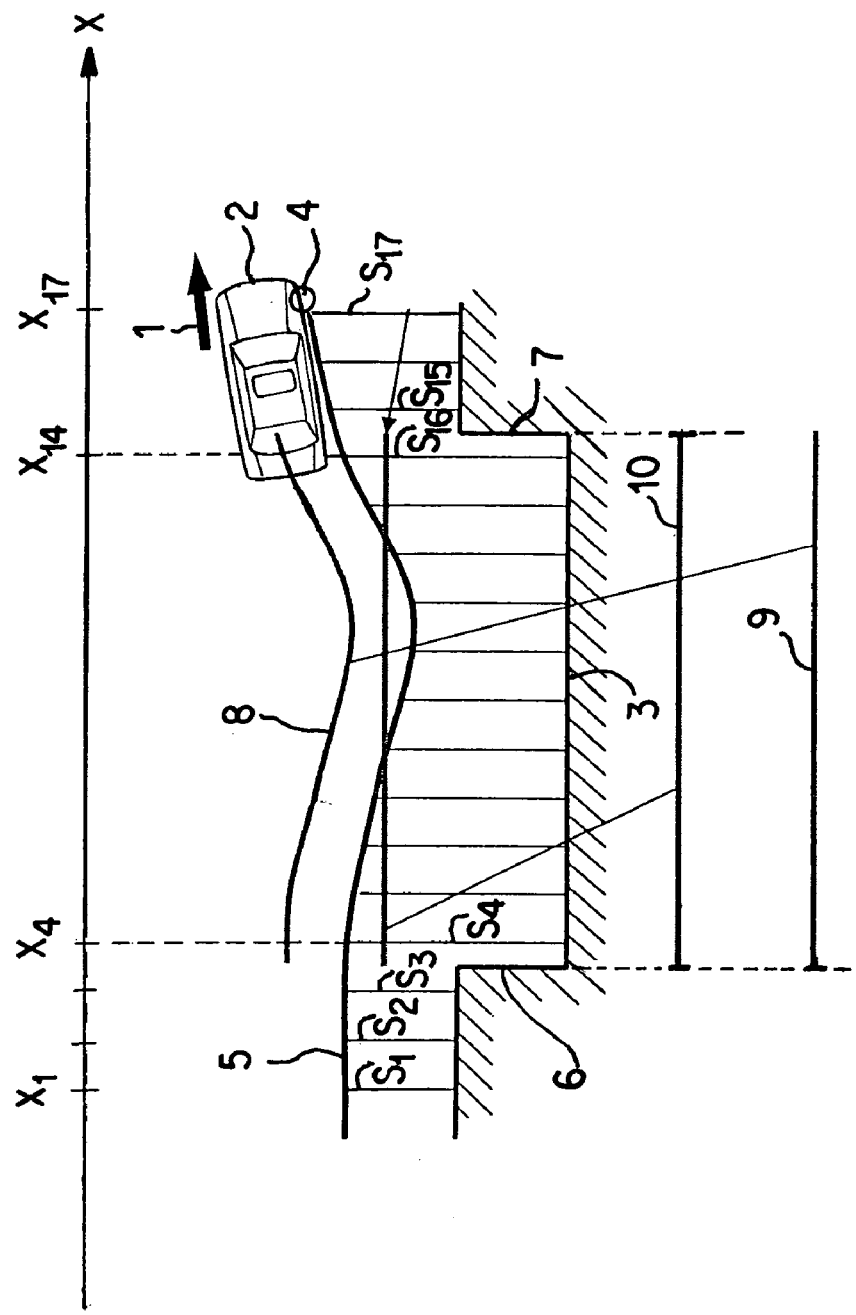
FIG. 3 illustrates the basic principle for determining the effective length of the parking gap.

FIG. 3 illustrates the basic principle for determining the effective length of a parking gap. The parking gap has a rear parking gap edge 6, a front parking gap edge 7 and a lateral curb or parking gap edge 3.

As in FIG. 2, in the example of embodiment shown here, as the vehicle is driven by the parking gap, it is steered briefly to the right and then driven forward diagonally to the left, which can be seen by sensor track 5 or driven track 8.

If sensor track 5 or driven track 8 is laid out onto straight line 9, this gives the parking gap length without taking into account the movement of the vehicle. It can be seen that the length of the parking gap without taking into account the movement of the vehicle, i.e., distance 9, is longer than the length of the parking gap taking into account the movement of the vehicle, i.e., distance 10. Distance 10 corresponds to the effective length of the parking gap. Effective parking gap length 10 can be determined by projecting the path covered, i.e., by projecting driven track 8 or sensor track 5 onto curb 3.

This is achieved by computer by the path covered by the vehicle at the individual measurement intervals in the area of the parking gap being converted for each measurement interval, using in each case the previously determined angle between the longitudinal axis of the vehicle and the curb (see above), into an effective section of length and added over the individual measurement intervals.

The position of rear parking gap end 6 and front parking gap end 7 can be determined by the distance signal supplied by the distance sensor which exhibits a positive jump if the distance sensor passes rear parking gap end 6 and a negative jump if distance sensor 4 passes front parking gap end 7.

Therefore, the length of a parking gap is detected over the path the vehicle covers when passing the parking gap. By taking into account the mathematical vehicle model and the detected angle between the longitudinal direction of the vehicle and the curb, it is also possible to determine precisely the effective length of the parking gap when the vehicle is not driven on a parallel or straight path by the parking gap.

By taking into account the movement of the vehicle, the exact position of a recognized parking gap relative to the vehicle can be calculated in the case of further movement of the vehicle. In summary, the following advantages are achieved with the invention: assisting the driver by indicating the length of the parking gap in the cockpit; automatically determining a starting position for an automatic parking system; precisely measuring a parking gap without steering movements or changes in speed having an effect on the measurement results; simple cost-effective sensors can be used based on the availability of precise mathematical vehicle models; computer expense is comparatively small relative to complex environment-detection algorithms; and a distance sensor attached to the vehicle is sufficient for exact detection of a parking gap. The surroundings are scanned as the vehicle is moving.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining geometric data for parking processes for vehicles, wherein the lateral distance between the vehicle and a curb is measured at least twice successively, by a vehicle-affixed distance sensor as the vehicle is driven alongside the parking space, and the angle between the longitudinal axis of a vehicle and the curb is determined, by the acts of:
    determining an angle of sideways movement between the present longitudinal direction of the vehicle and a preset longitudinal direction, which angle results from the sideways movement of the vehicle as it is driven by;
    determining a curb angle between the preset longitudinal direction and the curb resulting from the course of the contour of the curb; and
    determining the angle between the present longitudinal axis of the vehicle and the curb by adding the sideways movement angle and the curb angle.

2. The method according to claim 1, wherein the driving direction of the vehicle, when it is moving in a straight line before the sideways movement begins, is used as the preset longitudinal direction.

3. The method according to claim 1, wherein the angle of sideways movement is determined by the acts of:
    determining a sideways movement distance component, which results from a sideways movement of the vehicle transversally to the preset longitudinal direction, whereby the sideways movement distance component is determined by measuring the path covered by the vehicle as it is driven and the steering position of the vehicle by a preset movement model of the vehicle; and
    determining the angle of sideways movement from the sideways movement distance component and the path covered by the vehicle as it is driven.

4. The method according to one of claim 1, whereby the curb angle is determined by the acts of:
    determining a curb distance component which results from the course of the curb contour, whereby the curb distance component is determined from the difference of the difference of two successively measured distances and the corresponding sideways movement distance component; and
    determining the curb angle from the curb distance component and the path covered by the vehicle as it is driven.

5. The method according to claim 1, wherein curb angles are determined several times successively as the vehicle is driven by and a mean curb angle is formed from curb angles to smooth out measurement errors.

6. The method according to claim 5, wherein the angle between the longitudinal axis of the vehicle and the curb is determined by adding the angle of sideways movement and the mean curb angle.

7. The method according to claim 1, wherein the present distance between the distance sensor and the curb is a mean distance, wherein
    from several measured distance values the particular sideways movement distance component and the particular curb distance component are subtracted and a mean value is formed from the distance values obtained from the subtraction, and
    the present distance is determined by adding the mean value and the sideways movement distance component and the curb distance component.

8. The method according to claim 7, wherein the rear end of the parking gap is regarded as a positive jump exceeding a preset value in the determined distance between the distance sensor and the curb, and the front end of the parking gap is regarded as a negative jump exceeding a present value in the determined distance between the distance sensor and the curb.

9. The method according to claim 1, wherein the length of the parking gap is determined in the case of a parking gap, wherein
    an effective parking gap length is determined from the path covered by the vehicle as the vehicle is driven by the parking gap and the angles between the longitudinal axis of the vehicle and the curb determined at individual measurement points, which length corresponds to a projection of the path covered by the vehicle in the area of the parking gap onto the curb.

* * * * *